United States Patent
Song et al.

(10) Patent No.: US 11,151,163 B2
(45) Date of Patent: *Oct. 19, 2021

(54) SCALABLE SPINE NODES WITH PARTIAL REPLICATION OF ROUTING INFORMATION IN A NETWORK ENVIRONMENT

(71) Applicant: Cisco Technology, Inc., San Jose, CA (US)

(72) Inventors: Jialin Song, Cupertino, CA (US); Nikhil Gopinath Shetty, Milpitas, CA (US); Ravindra Nandalal Rathi, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,502

(22) Filed: Jan. 27, 2020

(65) Prior Publication Data

US 2020/0167369 A1 May 28, 2020

Related U.S. Application Data

(63) Continuation of application No. 14/810,200, filed on Jul. 27, 2015, now Pat. No. 10,572,509.

(51) Int. Cl.
*G06F 16/27* (2019.01)
*G06F 16/25* (2019.01)

(52) U.S. Cl.
CPC ............ *G06F 16/275* (2019.01); *G06F 16/25* (2019.01)

(58) Field of Classification Search
CPC .............................. G06F 16/275; G06F 16/25
USPC ......................................................... 709/226
See application file for complete search history.

(56) References Cited

U.S. PATENT DOCUMENTS

| 7,334,045 | B1 | 2/2008 | Jacobson et al. |
| 7,639,680 | B1 | 12/2009 | Roy et al. |
| 7,684,352 | B2 | 3/2010 | Smith et al. |
| 8,528,041 | B1 | 9/2013 | Haney et al. |
| 10,037,386 | B1 | 7/2018 | Esam |
| 2007/0204061 | A1 | 8/2007 | Chen et al. |
| 2008/0259820 | A1 | 10/2008 | White et al. |
| 2008/0263353 | A1 | 10/2008 | Droms et al. |
| 2009/0164663 | A1 | 6/2009 | Ransom et al. |
| 2011/0055621 | A1 | 3/2011 | Mandagere et al. |
| 2011/0286342 | A1 | 11/2011 | Ee et al. |

(Continued)

*Primary Examiner* — James E Springer
(74) *Attorney, Agent, or Firm* — Polsinelli

(57) ABSTRACT

Embodiments are provided for partially replicating endpoint routing information, and comprise calculating a first shard interval of a key space based, at least in part, on capacities of a plurality of spine nodes in a network fabric. Embodiments also include mapping the first shard interval to a first spine node of the plurality of spine nodes, communicating shard mapping information associated with the mapping to a set of leaf nodes in the network fabric, and populating an endpoint repository in the first spine node with routing information for one or more endpoints corresponding to the first shard interval. More specific embodiments include calculating respective shard intervals for other spine nodes of the plurality of spine nodes based, at least in part, on the capacities of the plurality of spine nodes. In specific embodiments, the calculating the first shard interval is based, in part, on one or more dynamic parameters.

20 Claims, 8 Drawing Sheets

(56) References Cited

U.S. PATENT DOCUMENTS

| | | |
|---|---|---|
| 2012/0271795 A1 | 10/2012 | Rao et al. |
| 2014/0013061 A1 | 1/2014 | Pangborn et al. |
| 2014/0140244 A1 | 5/2014 | Kapadia et al. |
| 2014/0310321 A1 | 10/2014 | Murata et al. |
| 2014/0376373 A1 | 12/2014 | Deshpande et al. |
| 2015/0124805 A1 | 5/2015 | Yadav et al. |
| 2015/0124820 A1 | 5/2015 | Attar et al. |
| 2015/0124826 A1 | 5/2015 | Edsall et al. |
| 2015/0127797 A1 | 5/2015 | Attar et al. |
| 2015/0131655 A1 | 5/2015 | Dayama et al. |
| 2015/0131663 A1 | 5/2015 | Brar et al. |
| 2015/0146539 A1 | 5/2015 | Mehta et al. |
| 2016/0021010 A1* | 1/2016 | Vasseur .................. H04L 45/04 370/235 |
| 2017/0024453 A1 | 1/2017 | Raja et al. |
| 2018/0019943 A1 | 1/2018 | Gobriel et al. |

\* cited by examiner

US 11,151,163 B2

SCALABLE SPINE NODES WITH PARTIAL REPLICATION OF ROUTING INFORMATION IN A NETWORK ENVIRONMENT

CROSS-REFERENCE TO RELATED APPLICATION

This application is a continuation of U.S. patent application Ser. No. 14/810,200 filed on Jul. 27, 2015, the contents of which is incorporated by reference in its entirety.

TECHNICAL FIELD

This disclosure relates in general to the field of networking, and more particularly, to scalable spine nodes with partial replication of routing information in a network environment.

BACKGROUND

Networking architectures have grown increasingly complex in communication environments. Traditional hierarchical data center networks are built in layers that resemble a hierarchical tree. A hierarchical tree architecture typically has an access layer at the bottom of the tree, an aggregation layer in the middle of the tree, and a core layer at the top of the tree. More recently, data centers have been implementing a leaf-spine hierarchical network architectures. In leaf-spine networks, a switching fabric provides an access layer comprising multiple leaf switches that are typically fully meshed to multiple spine switches. The leaf switches provide access to the switching fabric for endpoints at the bottom of the tree such as servers, firewalls, loadbalancers, appliances, routers (e.g., to other networks), etc. Each spine switch maintains routing information for all endpoints. The routing information is maintained in the switch process memory and also in a layer 3 (L3) routing lookup table. A fully populated switching fabric may contain millions of endpoints. Thus, the ability to provide efficient and scalable leaf-spine hierarchical networks can present significant challenges for network administrators and component manufacturers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
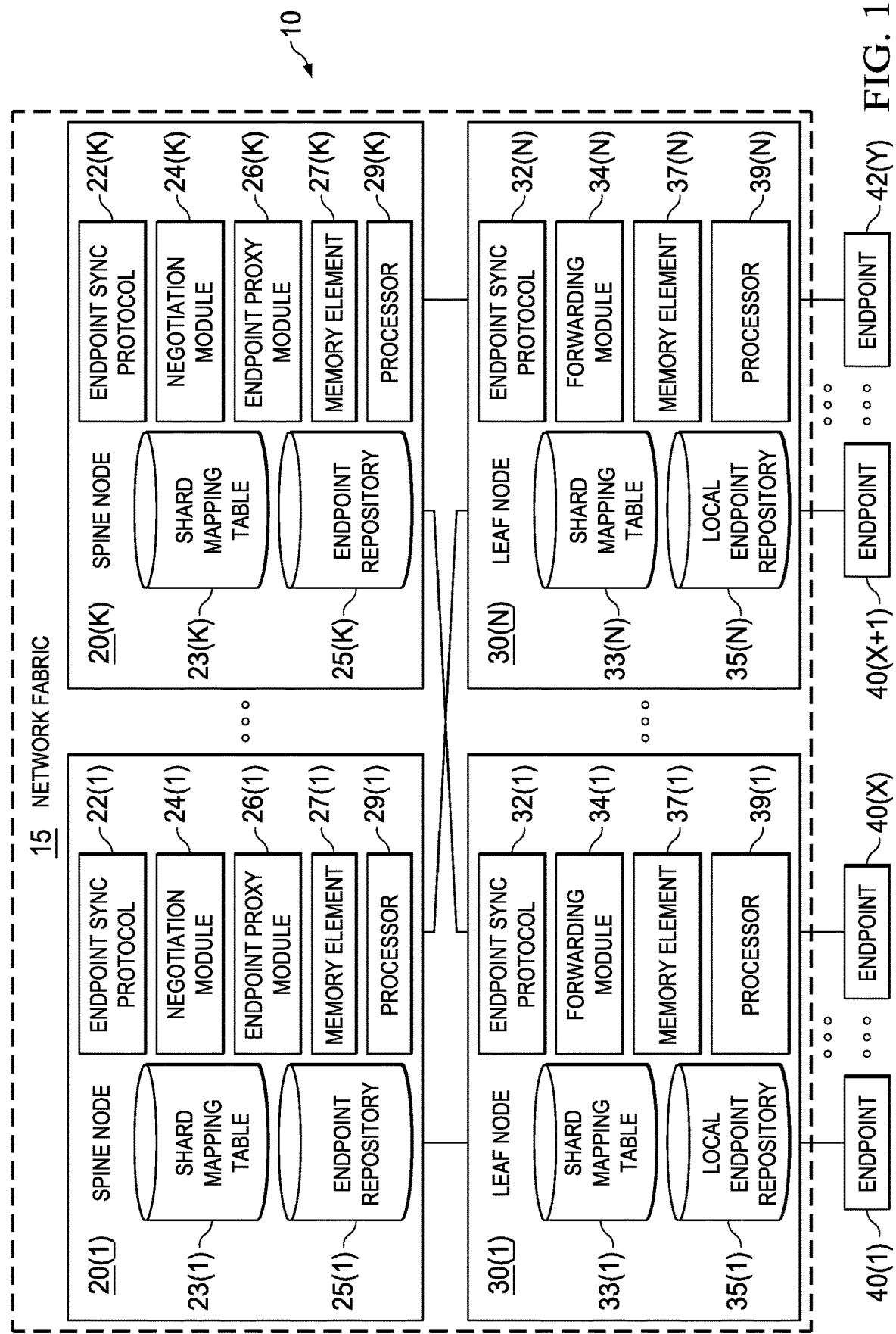
FIG. 1 is a simplified block diagram of an example network with a network fabric providing a system for partially replicating endpoint routing information according to at least one embodiment.

The present disclosure describes a partial replication system for a network fabric. A method is provided in one example and includes calculating a first shard interval of a key space based, at least in part, on capacities of a plurality of spine nodes in a network fabric. The method also includes mapping the first shard interval to a first spine node of the plurality of spine nodes, communicating shard mapping information associated with the mapping to a set of leaf nodes in the network fabric, and populating an endpoint repository in the first spine node with routing information for one or more endpoints corresponding to the first shard interval.

In specific embodiments, the method further includes determining a capacity of the first spine node and receiving capacity information indicating one or more other capacities for one or more other spine nodes of the plurality of spine nodes. In further specific embodiments, the method includes receiving a packet en route to a destination endpoint, identifying, if the destination endpoint does not correspond to the first shard interval, a second spine node mapped to a second shard interval, and forwarding the packet to the identified second spine node, where the destination endpoint corresponds to the second shard interval.

Yet further embodiments include calculating one or more other shard intervals for each one or more other spine nodes of the plurality of spine nodes based, at least in part, on the capacities of the plurality of spine nodes. In this embodiment, the first shard interval and the one or more other shard intervals may be assigned to the plurality of spine nodes in numerical sort order of tunnel endpoint Internet Protocol (IP) addresses of the plurality of spine nodes. In yet another embodiment, the method includes mapping at least one backup shard interval to the first spine node, where the at least one backup shard interval includes at least a portion of another shard interval mapped to another spine node. Each key of the shard interval may be included in one or more backup shard intervals mapped to one or more other spine nodes based on a replication factor.

In at least some embodiments, a hashing algorithm applied to a unique identifier of any one of the one or more endpoints corresponding to the first shard interval generates a key that is included in the first shard interval. Also, the shard mapping information may be communicated out of band to the set of leaf nodes in the network fabric. At least some embodiments include dynamically recalculating the first shard interval to determine an updated first shard interval based on the capacities of the plurality of spine nodes and one or more dynamic parameters of at least one spine node of the plurality of spine nodes. The one or more dynamic parameters may include a load of one or more of the plurality of spine nodes.

Some or all of the elements, operations, and features may be included in respective systems, apparatuses, and devices for performing the described functionality. Furthermore, some or all of the features may be implemented in at least one machine readable storage medium.

DESCRIPTION OF EMBODIMENTS

Turning to FIG. 1, FIG. 1 is a simplified block diagram of an example network 10 with a network fabric 15 providing a system for partially replicating endpoint routing information according to at least one embodiment. Network fabric 15 includes spine nodes 20(1)-20(K) and leaf nodes 30(1)-30(N), which are fully meshed. Typically, the total number of spine nodes is less than the total number of leaf nodes in a network fabric. In at least one embodiment, spine node 20(1) can include an endpoint synchronization protocol 22(1), a negotiation module 24(1), an endpoint proxy module 26(1), a shard mapping table 23(1) and an endpoint repository 25(1). Spine node 20(1) may also include other components such as one or more memory elements 27(1), one or more processors 29(1), one or more network interface cards and ports (not shown), and any other hardware (or software) to facilitate the operations thereof. Other spine nodes in the network fabric (e.g., spine nodes 20(2)-20(K)) may have the same or similar configurations (e.g., endpoint synchronization protocols 22(2)-22(K), negotiation modules 24(2)-24(K), endpoint proxy modules 26(2)-26(K), shard mapping tables 23(2)-23(K), endpoint repositories 25(2)-25(K), memory elements 27(2)-27(K), processors 29(2)-29(K), etc.). In some example network fabrics, however, endpoint repositories 25(1)-25(K) may have varied memory capacities.

Leaf nodes 30(1)-30(N) provide access for their respective endpoints 40(1)-40(Z) to fabric network 15, which enables communication between endpoints 40(1)-40(Z). In at least one embodiment, leaf node 30(1) can include an endpoint synchronization protocol 32(1), a forwarding module 34(1), a shard mapping table 33(1), and a local endpoint repository 35(1). Leaf node 30(1) may also include other components such as one or more memory elements 37(1), one or more processors 39(1), one or more network interface cards and ports (not shown), and any other hardware (or software) to facilitate the operations thereof. Other leaf nodes in the network fabric (e.g., leaf nodes 30(2)-30(N)) may have the same or similar configurations (e.g., shard mapping tables 33(2)-33(N), local endpoint repositories 35(2)-35(N), memory elements 37(2)-37(N), processors 39(2)-39(N), etc.).

Where appropriate herein, endpoints 40(1)-40(Z) are referred to collectively as 'endpoints 40', spine nodes 20(1)-20(K) are referred to collectively as 'spine nodes 20', and leaf nodes 30(1)-30(N) are referred to collectively as 'leaf nodes 30'. Similarly, other elements in spine nodes 20 and leaf nodes 30, such as endpoint synchronization protocols 22(1)-22(K), shard mapping tables 23(1)-23(K), negotiation modules 24(1)-24(K), endpoint repositories 25(1)-25(K), endpoint proxy modules 26(1)-26(K), memory elements 27(1)-27(K), processors 29(1)-29(K), forwarding modules 32(1)-32(N), shard mapping tables 33(1)-33(N), local endpoint repositories 35(1)-35(N), memory elements 37(1)-37(N), and processors 39(1)-39(N), may be similarly referenced where appropriate. Also, for ease of reference, in some instances spine nodes may be referred to as 'spines' and leaf nodes may be referred to as 'leaves'.

For purposes of illustrating certain example techniques of network fabric 15, it is important to understand the communications that may be traversing the network and the protocols used in effecting such communications. The following foundational information may be viewed as a basis from which the present disclosure may be properly explained.

In a leaf-spine hierarchical data center network architecture, each leaf node may have a local endpoint repository and a routing lookup table. A routing lookup table may be stored in a ternary content-addressable memory (TCAM) and can be derived from the endpoint repository. A local endpoint repository, which is also referred to as a routing information base (RIB), of a leaf node may only include mapping information of learned endpoints behind that leaf node. A leaf node RIB can learn mapping information for each endpoint in the network and the address of the leaf node (or tunnel endpoint) that the endpoint sits behind.

Leaf nodes, however, may not always have a fully replicated RIB. This is particularly true in the beginning after a leaf node is booted (or rebooted), when the RIB in the leaf node is still being populated. In this case, when the leaf node receives unknown unicast traffic, if a destination address (e.g., Media Access Control (MAC)/Internet Protocol (IP)) in a packet is missing from the leaf node's local routing lookup table, the leaf node relies on an endpoint proxy residing in a spine node to forward this unknown unicast traffic to the egress leaf node. In a full mesh leaf-spine network, a leaf node may send unknown unicast traffic to any spine node via a spine node anycast address. Thus, the traffic may be sent to the closest spine node without regard to what routing information is maintained by the spine node. Therefore, each spine node has to maintain routing information in its process memory for all endpoints in the network, in addition to a layer 3 (L3) routing lookup table.

A fully populated network fabric may contain millions of endpoints. This can pose significant performance and scalability challenges over central processing unit loads, memory utilization, and network bandwidth. In addition, it can be difficult to ensure fast convergence and consistency for such a huge routing information repository across all spine nodes. The capacity of a network is limited by the capacity of the least capable spine node (hotspot) in the network fabric. For example, if a network fabric has one spine node that can process a maximum of 100K endpoints, then the endpoint RIB replicated in all spine nodes of the network fabric will be limited to routing information for 100K endpoints even if other spine nodes have more capacity and can process significantly more endpoints (e.g., 1.2 million endpoints). Consequently, the less capable spines may become a 'hotspot', while the larger spine nodes are idle or not fully utilized. For virtual switch networks containing software endpoint proxies, similar challenges exist.

Embodiments of a network with a network fabric, as described herein, can resolve the aforementioned issues (and more) by providing a system for partial replication of endpoint routing information, where each spine node maintains a subset of endpoint routing information for the network. More specifically, endpoint routing information of the network is divided and distributed across multiple spine nodes using a sharding protocol and a configurable replication factor. The sharding protocol can divide and distribute endpoint routing information based on load, capacity, and/or fault state of spine nodes in at least one embodiment. Furthermore, the sharding protocol can be applied before endpoint routing information is learned in a network fabric, and may also be subsequently applied dynamically based on various triggers in the network (e.g., fault state changes, new spine node added to network fabric, spine node removed from network fabric, load changes, etc.). A shard mapping table can be generated and stored in the spine nodes and can include shard mapping information that indicates which spine nodes can provide routing information for which endpoints. The shard mapping information can be propagated to leaf nodes in the network fabric by an out of band controller or a control plane protocol. Propagating the shard mapping information enables the leaf nodes to forward unknown unicast traffic to the correct spine node without additional data path performance penalties.

Several advantages can be achieved by offering a system for partially replicating endpoint routing information in the spine nodes of a network fabric. First, a partial replication system can significantly improve scalability and convergence of spine nodes, by reducing the network bandwidth, central processing unit loads, and process and hardware routing lookup table memory requirements needed to maintain full replication of endpoint RIBs on each spine node. With a partial replication system, the maximum number of endpoints a network fabric can process scales linearly with the number of spine nodes. Thus, the fabric endpoint capacity can be significantly increased because more endpoint routes can be maintained using partial endpoint repository replication. In addition, spine heterogeneity can be accommodated in a network fabric, because the network fabric is not limited to the capacity of the least capable spine node. By way of example, a network fabric can handle more than 1.2 million endpoints when the network fabric includes a spine node, which is capable of handling 1.2 million endpoint routes when fully loaded, along with less capable spine nodes. Another advantage in a partial replication system includes sharding negotiation between spine nodes that can be dynamic and that can be based on load, capacity, fault state, other static or dynamic parameters, or any suitable combination thereof. Moreover, the initial sharding negotiation and subsequent dynamic sharding negotiation can remain mostly transparent to leaf nodes by advertising shard interval ownership (e.g., shard mapping information) via link layer protocols or fabric control protocols.

Turning to FIG. 1, a brief description is provided about some of the possible infrastructure that may be included in network 10. Network 10 represents a series of points or nodes of interconnected communication paths for receiving and sending communications that propagate through the network. Elements of FIG. 1 may be coupled to one another through one or more virtual or physical interfaces employing any suitable connection, which provides a viable pathway for electronic communications. The teachings of this disclosure can be implemented in many different types or topologies of networks including, but not limited to, a local area network (LAN), wireless local area network (WLAN), Intranet, Extranet, virtual local area network (VLAN), virtual private network (VPN), virtual extensible local area network (VXLAN), virtual private LAN service (VPLS), any suitable combination thereof, or any other appropriate architecture or system that facilitates communications in a network environment.

Communications in network 10 are referred to herein as 'network traffic' or 'traffic', which may be inclusive of packets. A packet is a formatted unit of data, and can contain both control information (e.g., source and destination endpoint addresses, etc.) and data, which is also known as payload. A single communication from a source endpoint to a destination endpoint may be broken up into multiple discrete packets with different payloads. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Also, link layer protocols may be utilized to facilitate communications related to the sharding protocol and other routing information including, but not limited to, Link Layer Discovery Protocol (LLDP) and Intermediate System to Intermediate System (IS-IS).

The term 'data' as used herein, refers to any type of binary, numeric, voice, video, textual, or script data, or any type of source or object code, or any other suitable information in any appropriate format that may be communicated from one point to another in electronic devices and/or networks. Additionally, advertisements, messages, requests, responses, replies, queries, etc. can be forms of network traffic.

Spine nodes 20 and leaf nodes 30 are virtual or physical switches or other network elements that include switching functions and that facilitate electronic communication in a given network. As used herein, the term 'network element' is meant to encompass routers, switches, wireless access points (WAPs), gateways, bridges, loadbalancers, appliances, firewalls, servers, processors, modules, or any other suitable device, component, element, proprietary appliance, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information. Spine nodes 20 and leaf nodes 30 can be layer 2 (L2) or layer 3 (L3) devices such that the links between the spine and leaf layers of the architecture are either switched (L2) or routed (L3). In addition, in at least one implementation, network fabric 15 may implement a Top of Rack (ToR) network architecture for leaf nodes 30.

In at least one embodiment, endpoints 40 are connected to network fabric 15 through leaf nodes 30. Network fabric 15 facilitates communication among endpoints that are connected to different leaf nodes 40. Endpoints 40 can be various network elements including, but not limited to, servers, firewalls, loadbalancers, appliances, wireless access points (WAPs), gateways, routers (e.g., to other fabric pods, to the Internet, etc.), and hosts.

In at least one example implementation, spine nodes 20 and leaf nodes 30 include logic to achieve (or to foster) the activities that enable partial replication of endpoint routing information in a spine layer, as outlined herein. Note that in at least one example, each of these elements can have an internal structure (e.g., processors 27, 37, memory elements 29, 39, network interface cards, ports, etc.) to facilitate some of the operations described herein. In other embodiments, these activities that enable partial replication of endpoint routing information in a spine layer may be executed externally to these elements, or included in some other network element to achieve this intended functionality. In at least one embodiment spine nodes 20 and leaf nodes 30 may include this logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

Spine nodes 20 may include negotiation modules 24 to enable communication among spine nodes 20 to divide and distribute endpoint routing information across spine nodes 20 using a sharding protocol. In a particular example, spine nodes 20 communicate with each other to negotiate ownership of a key space (e.g., 32 bits). A sharding algorithm can be used to divide a key space into a number of shard intervals that equals a total number of spine nodes 20 in the network fabric. Each shard interval can define a range of keys within the key space. Each endpoint in network 10 corresponds to a key in one of the shard intervals. The shard intervals can be mapped to respective spine nodes 20. In at least one embodiment, the shard intervals are assigned to each spine node in numerical sort order of their tunnel endpoint IP (TEP IP) addresses. To provide redundancy, each spine node can be a primary owner of one shard interval (also referred to herein as a 'primary shard interval'), as well as a backup owner of one or more other 'backup shard intervals' that belong to other spine nodes. Each spine node maintains an endpoint repository (e.g., endpoint repositories 25) and programs a hardware routing table (e.g., TCAM) for endpoints corresponding to a primary shard interval mapped to the spine node and for endpoints corresponding to any backup shard intervals mapped to the spine node.

The size of a primary shard interval and any backup shard intervals mapped to a particular spine node can be determined based, at least in part, on a total number of spine nodes in the network fabric and static parameters such as the capacities of the spine nodes. The capacity of a spine node correlates to how many endpoint routes the spine node can manage. The size of the primary and backup shard intervals may also depend on dynamic parameters. Dynamic parameters can include, but are not limited to a current load of the spine node and/or a fault state of the spine node. Thus, the endpoint routes can be load-balanced across all operational spine nodes 20 within network fabric 15.

In at least one embodiment, the key space may be 32 bits. A unique 32-bit key may be generated for each endpoint based on a unique identifier of the endpoint. For endpoints attached to a layer 2 leaf node, a key corresponding to an endpoint can be generated by applying a hashing algorithm to a bridge domain (BD) and Media Access Control (MAC) address of the endpoint in order to hash the BD and MAC address into the key space. For endpoints attached to a layer 3 leaf node, a key corresponding to an endpoint can be generated by applying a hashing algorithm to virtual routing function (VRF) virtual network identifier (VNID) and Internet Protocol (IP) address of the endpoint in order to hash the VRF VNID and IP address into the key space. It will be apparent that the keys generated for the endpoints may be based on any other suitable unique identifier of those endpoints, and the unique identifier may be a single identifier or a combination of identifiers.

In at least one embodiment, the hashing algorithm applied to the BD and MAC address or the VRF and IP address is designed to hash into the key space evenly. In one example, a Jenkins hash function may be used as the hashing algorithm. The Jenkins hash functions are a collection of non-cryptographic hash functions for multi-byte keys. It will be apparent that other suitable hash functions may be used alternatively, depending on particular design criteria and implementations.

In at least one embodiment, primary shard intervals are assigned to each spine node in numerical sort order of their tunnel endpoint IP (TEP IP) addresses. By way of example, consider a network fabric of 12 spine nodes of the same capacity. The spine node having the fourth largest TEP IP address can own the primary shard interval of $(3*2^32/12, 4*2^32/12]$. The spine node with the fifth largest TEP IP address can own the primary shard interval of $(4*2^32/12, 5*2^32/12]$ and so on. In this example, any endpoint with a hashed key falling into the interval $(3*2^92/12, 4*2^32/12]$ has routing information that is owned by the fourth spine node (e.g., in endpoint repository of the fourth spine node and hardware routing table/TCAM of the fourth spine node).

In a more complicated example where the capacities of the spines are taken into consideration, the shard allocation and assignment can be a function of the number of spines and the capacity level of each spine in the fabric. For example, if a least capable spine is assigned a capacity level of 1, a spine that is two times more powerful can have a capacity level of 2, a spine that is four times more powerful can have a capacity level of 4, and so on. The primary shard can be assigned in such a way that the spine of capacity level 4 has a shard twice the size of the capacity level 2 spine and 4 times the size of the capacity level 1 spine. The combined primary shards of all spines should cover the complete 32 bit key space. If a replication factor #R, is configured for the network fabric, each spine node can be the backup owner of #R shards. The size of each backup shard owned by a spine can be the same size as the spine's primary shard.

Figure 3A:
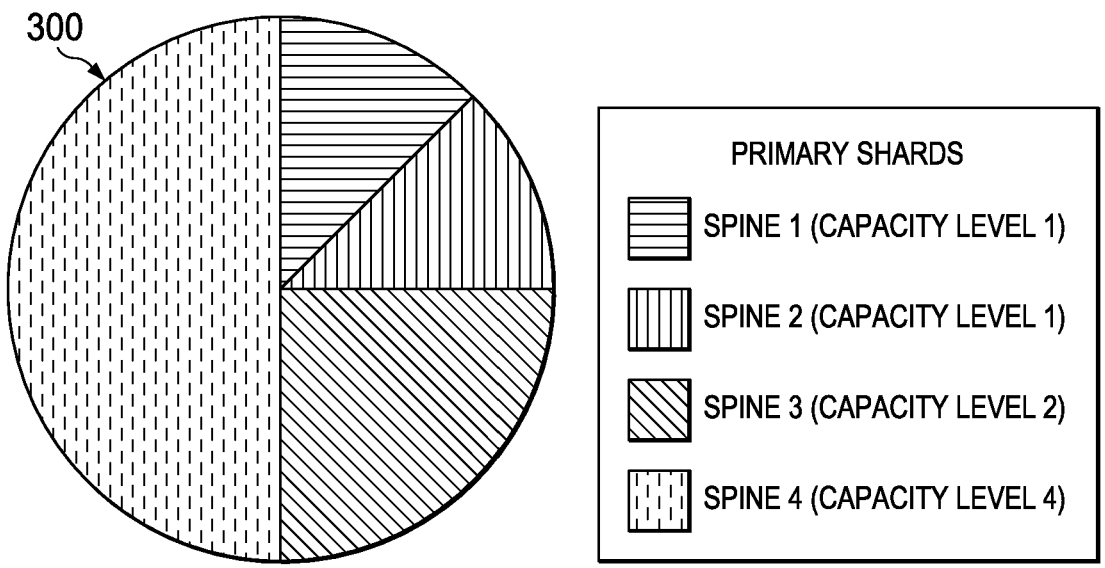
FIGS. 3A and 3B are pie charts graphically illustrating shard intervals of an example scenario according to at least one embodiment.
Figure 3B:
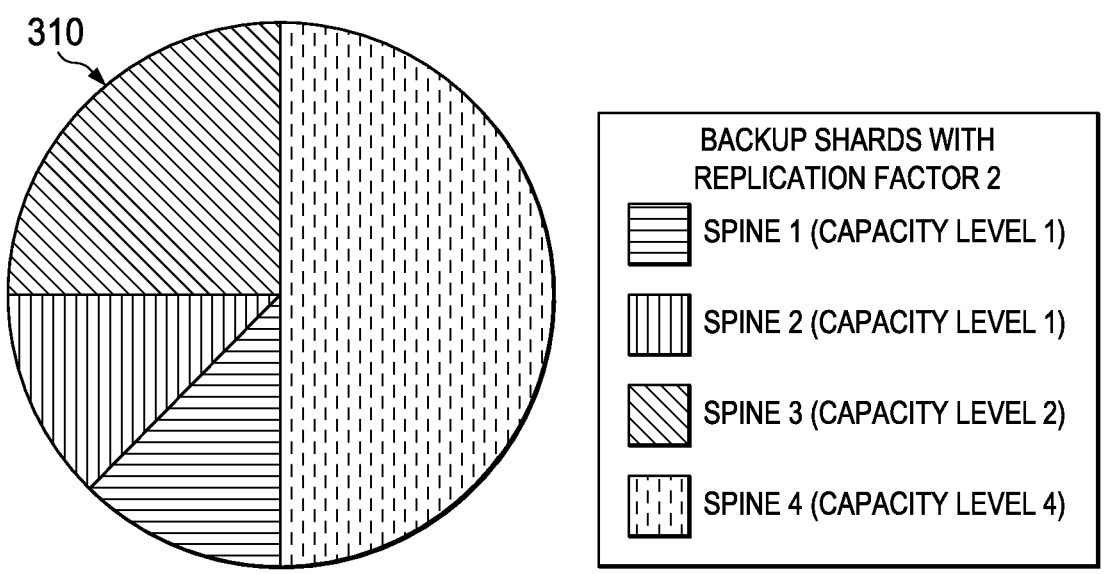

One example to calculate a backup shard interval of each spine with a replication factor of 2 is demonstrated in example pie charts 300 and 310 of FIGS. 3A and 3B. In primary shard pie chart 300, spine1 and spine2 own the first quarter (i.e., 12.5% each) of the key space with intervals of $[0, 2^32/8)$ and $[2^32/8, 2^32/4)$, respectively. Spine3 owns the second quarter of the key space with an interval of $[2^32/4, 2^32/2)$. Spine4 owns the second half the key space $[2^32/2, 2^32)$. To calculate the backup shard intervals, all primary shards can be rotated (e.g., clockwise or counter-clockwise) by the biggest primary shard size. The resulting backup shards are depicted in backup shard pie chart 310 of FIG. 3B. Each spine owns the rotated shard interval as their backup shard. Similarly, for a replication factor of 3, the shard pie chart can be rotated one more time and the backup interval can be assigned. In at least some embodiments, a single continuous range of keys within the key space may include a primary shard interval and one or more backup shard intervals owned by a spine node.

Shard mapping tables 23 can be provided in spine nodes 20, and shard mapping tables 33 can be provided in leaf nodes 30. Shard mapping tables 23 and 33 may be stored in one or more databases, files, caches, or any other suitable storage structure, or any suitable combination thereof. Shard mapping tables 23 and 33 may be internal to spine nodes 20 and leaf nodes 30, respectively. In some other embodiments, shard mapping tables 23 and 33 may be external (entirely or in part) to spine nodes 20 and leaf nodes 30 using, for example, some network storage technique such as network attached storage (NAS) or storage area network (SAN). In some instances, shard mapping tables 23 could be consolidated in a suitable form and location to be accessible to spine nodes 20, and/or shard mapping tables 33 could be consolidated in a suitable form and location to be accessible to leaf nodes 30. In some other instances, shard mapping tables 23 and 33 could be consolidated in a suitable form and location to be accessible to spine nodes 20 and leaf nodes 30.

Shard mapping tables 23 and 33 can be populated with information that indicates which spine nodes own which shard intervals. In one example, shard mapping tables 23 and 33 can include mappings between primary shard intervals and their assigned spine nodes, and mappings between backup shard intervals and their assigned spine nodes. As used herein, the term 'mapping' is intended to include a marking or linking technique (e.g., pointers, indexes, file names, relational databases, hash table, etc.), or any other technique that indicates a relation, association, correspondence, connection, or link between two or more 'mapped' items.

Spine nodes 20 can advertise shard mapping information to leaf nodes 30. Shard mapping information can be information in any suitable form that identifies at least one spine node and the primary and backup shard intervals it owns. In at least one embodiment, each spine node advertises its own primary shard interval and backup shard interval(s) to every leaf node in network 10. This shard mapping information can be communicated to each leaf node through an out-of-band fabric controller or through switch control plane protocol such as, for example, link layer discovery protocol (LLDP) or intermediate system to intermediate system (IS-IS) protocol. LLDP can be used to advertise the shard mapping information to directly connected leaf nodes via fabric ports. Alternatively, one spine node anycast address can be created for each shard interval and propagated to leaf nodes through IS-IS protocol as route attributes. Knowledge of the shard mapping information enables leaf nodes 30 to forward unicast traffic to the correct spine node (i.e., the spine node that owns a shard interval corresponding to the destination endpoint of the unicast traffic).

Spine nodes 20 can also be provided with endpoint synchronization protocol 22, for learning routing information of endpoints 40 and populating endpoint repositories 25. Endpoint repositories 25 can be provided in spine nodes 20, and may be stored in the form of one or more databases, files, caches, or any other suitable storage structure, or any suitable combination thereof. In at least one embodiment, endpoint repositories 25 can each be configured as partially replicated routing information bases (RIBs) for network 10. A RIB can contain routing information for endpoints in network 10. In particular, routing information for an endpoint indicates which leaf node the endpoint is behind. In embodiments disclosed herein, an endpoint repository of a particular spine node contains routing information only for endpoints corresponding to a primary shard interval mapped to the spine node and for endpoints corresponding to any backup shard intervals mapped to the spine node. A spine 'owns' the routing information of an endpoint if the spine maintains the routing information for that endpoint in the spine's endpoint repository and hardware lookup tables (e.g., TCAM).

Routing information for endpoints 40 can be learned by spine nodes 20 when leaf nodes 30 advertise or otherwise communicate information about new endpoints 40 or any other endpoint for which routing information is not available in a spine node. In at least one embodiment, endpoint synchronization protocol 22 and 32 can be provided on spine nodes 20 and leaf nodes 30, respectively, to enable this communication and learning. A control plane endpoint manager of a leaf node does not have to be aware of spine node topology in order to advertise learned endpoints. For example, when leaf node 30(1) learns of a new endpoint, leaf node 30(1) may advertise the new endpoint via endpoint synchronization protocol 32(1) to any spine node in network fabric 15. The endpoint synchronization protocol of the receiving spine node can forward the advertisement to the primary shard owner and backup shard owners. For example, if spine node 20(1) receives an advertisement, it may store routing information for the endpoint in endpoint repository 25(1) if the endpoint corresponds to a shard interval owned by spine node 20(1). Otherwise, endpoint synchronization protocol 22(1) on spine node 20(1) can forward the endpoint advertisement to the appropriate spine. The appropriate spine node can be identified by generating a key for the endpoint and querying shard mapping table 23(1) to identify both the shard interval that contains the key and the primary and backup spine nodes that are mapped to the identified shard interval.

Forwarding modules 34 can be provided in leaf nodes 30 for forwarding unknown unicast traffic from an attached endpoint to the appropriate spine node in network fabric 15. By way of illustration, when leaf node 30(1) receives unicast traffic from an attached endpoint and the unicast traffic contains a destination address that is not found in local endpoint repository 35(1), then leaf node 30(1) can generate a key for the destination endpoint by hashing a unique identifier of the destination endpoint (e.g., the BD and MAC address or the VRF and IP address). Shard mapping table 33(1) can be queried to identify a shard interval that contains the key, and to identify one of the multiple spine nodes owning the identified shard interval. The unknown unicast traffic can be forwarded to the identified spine node. However, if a spine node is not identified (e.g., shard mapping table 33(1) does not include a shard interval containing the key), then the unknown unicast traffic can be forwarded to any of the spine nodes 20. The receiving spine node can then forward the unknown unicast traffic to the appropriate spine node.

Endpoint proxy modules 26 of spine nodes 20 can be provided in spine nodes 20 for forwarding received traffic to the appropriate leaf node or spine node in network fabric 15. A spine node can forward unknown unicast traffic to another spine node that owns the routing information of the destination endpoint of the unknown unicast traffic. For example, when unknown unicast traffic is received by spine node 20(1), endpoint proxy module 26(1) can generate a key for the destination endpoint of the unknown unicast traffic by hashing a unique identifier of the destination endpoint (e.g., the BD and MAC address or the VRF and IP address). Endpoint proxy module 26(1) can then query shard mapping table 23(1) to identify a shard interval that includes the key, and to identify a spine node mapped to the identified shard interval. If the identified shard interval does not belong to spine node 20(1) (e.g., if the identified shard interval is not mapped to spine node 20(1) in shard mapping table 23(1)), then the unknown unicast traffic can be forwarded to the identified spine node, which can forward the traffic to the leaf node to which the destination endpoint is connected. However, if the identified shard interval belongs to spine node 20(1), then spine node 20(1) can determine the correct routing information to the destination endpoint (e.g., from endpoint repository 25(1), from a hardware routing table/TCAM, etc.) and can forward the traffic based on the routing information.

If spine node 20(1) receives traffic other than unknown unicast traffic, then spine node 20(1) should have routing information for the destination endpoint in endpoint repository 25(1). Endpoint proxy module 26(1) can determine the correct routing information to the destination endpoint (e.g., from endpoint repository 25(1), from a hardware routing table/TCAM, etc.) and can forward the traffic based on the routing information. If the routing information is not found, then spine node 20(1) can determine the appropriate a spine node mapped to the destination endpoint of the traffic as previously described. Spine node 20(1) can then forward the traffic to the identified spine node, which can then forward the traffic to the leaf node to which the destination endpoint is attached.

Figure 2:
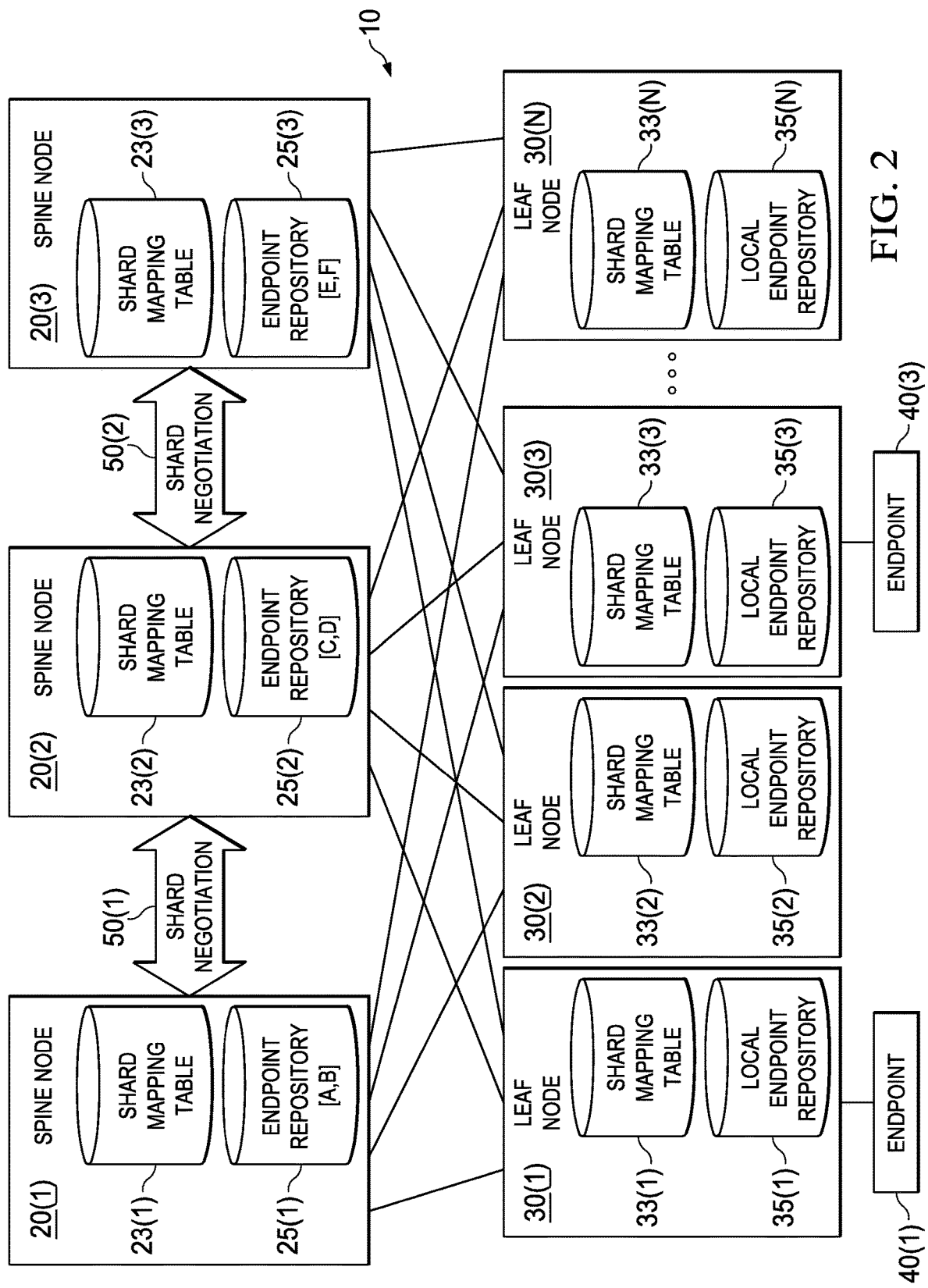
FIG. 2 is a simplified block diagram of an example implementation of the network with the partial replication system and the network fabric having three spine nodes.

FIG. 2 illustrates an example implementation of network 10 with network fabric 15 having three spine nodes 20(1), 20(2), and 20(3) according to at least one embodiment. In this example, spine nodes 20(1) and 20(2) have the smallest capacity (e.g., 0.3 million endpoint routes), and spine node 20(3) has the largest capacity (e.g., 0.6 million endpoint routes). A capacity level of 3, 3 and 6 can be assigned to these spines respectively.

Spine nodes 20(1), 20(2), and 20(3) can negotiate with each other as indicated by shard negotiations 50(1) and 50(2), and can apply a sharding algorithm to divide a 32-bit key space into three primary shard intervals, one for each spine node. Although not shown in FIG. 2, it will be apparent that shard negotiations may occur between any two spine nodes including spine node 20(1) and spine node 20(3). The negotiations can include periodic ping/pong beacon messages being exchanged among the spines. These messages enable each spine to know the capacity of all other spine in the fabric. Based on this knowledge, each spine can independently calculate the shard intervals for each spine using the same algorithm. This ensures the resulting shard mapping to be in sync across the entire fabric. Shard mapping tables 23(1), 23(2), and 23(3) can be generated, which include information indicating which shard intervals are mapped to which spine nodes.

An example sharding algorithm as described above may determine how many endpoint routes each spine node can efficiently manage, a size of a shard interval for each spine node, and a particular range of the key space for each shard interval. In addition to the static parameters like capacity, dynamic parameters, or both may be used for this determination. For example, the capacity of a spine node is a static parameter and can be used to determine an upper limit or maximum number of endpoints the spine node should be able to manage. Dynamic parameters may also be considered in some scenarios, such as a current load of a spine node. For example, if a load of a spine node is too high (e.g., above a certain threshold load), then the maximum number of endpoints allowed by the spine node's capacity may be adjusted downwardly to enable the spine node to operate more efficiently. In at least one embodiment, shard negotiation includes spine nodes 20 communicating both static and dynamic parameters to other spine nodes 20 in network fabric 15 to be used by instances of the sharding algorithm.

A size of a primary shard interval for the spine node can be determined based, at least in part, on the number of spine nodes and their capacity levels. For example, if spine node 20(1) is determined to be capable of managing ¼ of the endpoint routes that can be maintained by all spine nodes 20, then the primary shard interval mapped to spine node 20(1) may include ¼ of the key space. The hashing algorithm applied to the endpoint identifiers (e.g., BD and MAC, VRF and IP) may be configured to generally distribute the hashed keys evenly. Thus, the shard interval mapped to spine node 20(1) should correspond to about ¼ of the endpoints in the network.

Also, when negotiating the size of a shard interval, dynamic parameters, such as a fault state parameter, may also be considered. For example, if a spine node goes down (i.e., crashes or otherwise stops operating), then the sharding algorithm can be dynamically re-applied, and the endpoints can be spread across the remaining, operational spine nodes. Consequently, the size of the shard intervals (and the particular range in the key space) may be adjusted to compensate for the loss of one of the spine nodes.

Last, a particular range for the shard interval in the key space can be determined in any suitable way once the size of the shard interval is determined. In one example, shard intervals are assigned to spine nodes 20 in numerical sort order of their tunnel endpoint IP (TEP IP) addresses. Spine nodes 20 may communicate with other spine nodes in network fabric 15 (e.g., during sharding negotiations) to provide their TEP IP addresses to each other.

In the example illustration of FIG. 2, the shard intervals assigned to spine nodes 20(1), 20(2), and 20(3), based on a 32-bit key space, can reflect variations in capacities. For example, the following primary shard intervals could be assigned to spine nodes 20(1)-20(3) based on the indicated capacities:

| Spine Node | Capacity | Primary Shard Interval |
| --- | --- | --- |
| Spine node 20(1) | 0.3M endpoint routes | [0, 0x40000000) |
| Spine node 20(2) | 0.3M endpoint routes | [0x40000000, 0x80000000) |
| Spine node 20(3) | 0.6M endpoint routes | [0x80000000, 0xFFFFFFFF] |

The example above is simplified to include only primary shard intervals mapped to spine nodes 20(1), 20(2), and 20(3). Embodiments disclosed herein, however, accommodate redundancy of endpoint routing information in the spine nodes. Thus, one or more backup shard intervals may also be mapped to spine nodes 20(1), 20(2), and 20(3), based on a replication factor, #R. The replication factor #R could be configured by a user or determined automatically (e.g., default replication factor, network policies, tenant policies) for the network fabric. In at least one embodiment, each spine can be the backup owner of #R−1 shards and the size of each backup shard for a spine can be the same size as the spine's primary shard. In one example, for a replication factor of two, a single continuous range of keys within the key space could include the primary shard interval and a backup shard interval, which are owned by spine node 20(1).

Embodiments described herein enable a network fabric to support more endpoints with less configured hardware, in addition to spine heterogeneity and faster convergence due to a distributed endpoint repository maintenance cost. For example, a network fabric with four spine nodes that individually (or together with full replication) can support 600K endpoint routes, can together with the partial replication teachings herein support 2.4M endpoint routes. Similarly, a network fabric with four spine nodes that individually (or together with full replication) can support 1.2M endpoint routes, can together with the partial replication teachings herein support 4.8M endpoint routes. A fabric pod (i.e., multiple fabric networks and corresponding endpoints) with twelve spine nodes that individually support 1.2M endpoint routes, can support up to 14.4M endpoint routes. Thus, the maximum number of endpoint routes supported by the network fabric scales linearly with the number of spine nodes.

Figure 4:
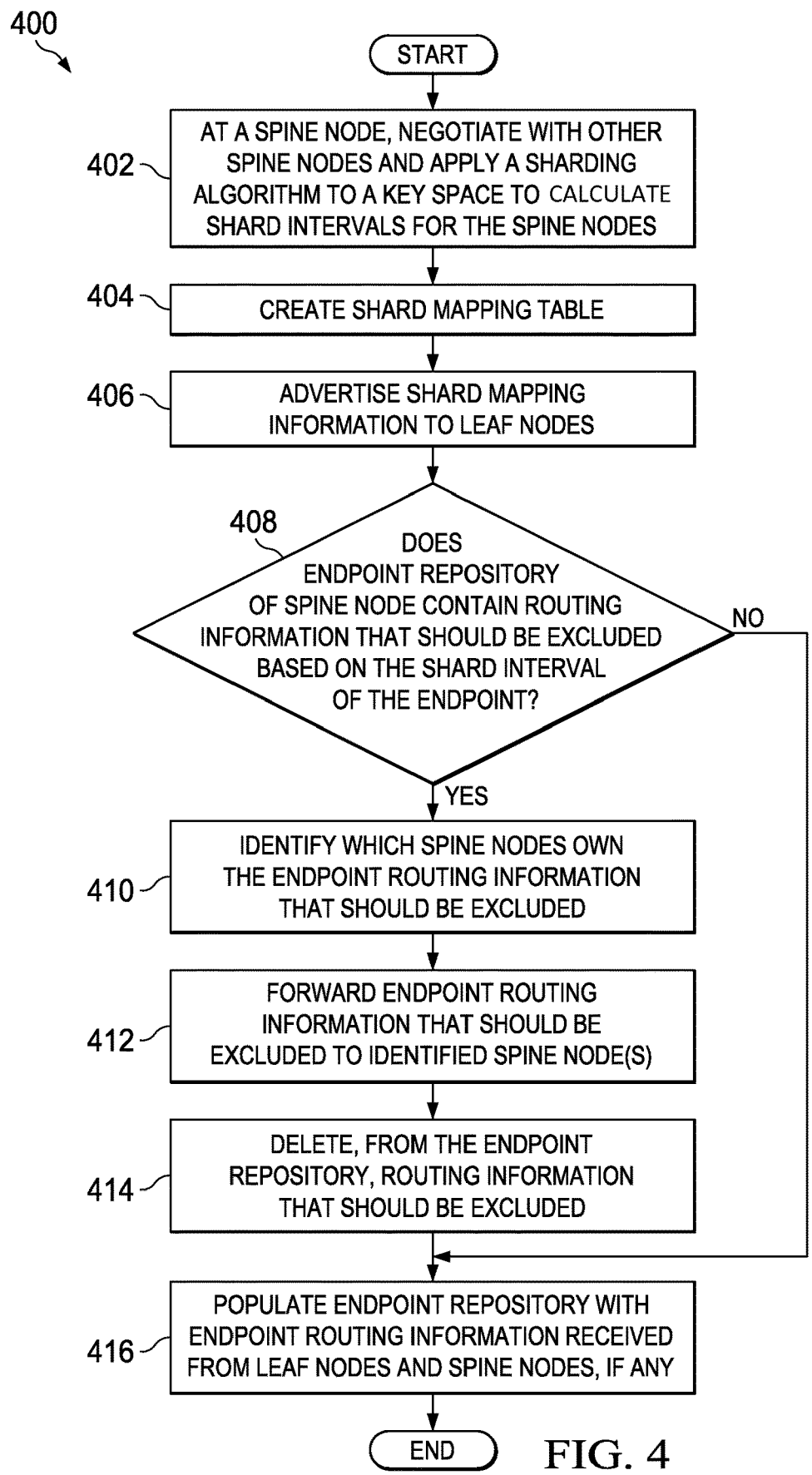
FIG. 4 is a simplified flowchart illustrating possible operations associated with the partial replication system according to at least one embodiment.

Turning to FIGS. 4-8, FIGS. 4-8 are simplified flowcharts illustrating possible operations associated with a system for partially replicating endpoint routing information in network fabric 15 according to at least some of the embodiments disclosed herein. In FIG. 4, a flow 400 illustrates one or more possible operations that may be performed by spine nodes 20 of FIGS. 1 and 2. Spine nodes 20 may comprise means, including for example, processors 29, for performing such operations. In at least one embodiment, negotiation modules 24 of spine nodes 20 are configured to perform, when executed by a processor, one or more of the operations. For ease of explanation, and where appropriate, the description provided for flows of FIGS. 4-8 may refer to spine node 20(1), leaf node 30(1), and/or endpoint 40(1), although it will be apparent that the flows of FIGS. 4-8 could involve any one or more spine nodes 20, leaf nodes 30, and endpoints 40 of network fabric 15.

Flow 400 may be initiated when spine nodes 20 need to learn endpoint routes (e.g., when spine nodes are reset or powered on). Flow 400 may also be initiated dynamically when some trigger indicates the sharding algorithm is to be applied to recalculate shard intervals for network fabric 15. In some implementations, at least some portions of flow 400 may be performed by each spine node in network fabric 15.

At 402, spine node 20(1) negotiates with other spine nodes in network fabric 15 (e.g., spine nodes 20(2)-20(K)) and applies a sharding algorithm to a key space to calculate shard intervals for the spine nodes. More details related to applying the sharding algorithm to the key space and negotiating with the other spine nodes will be discussed herein at least with reference to FIG. 5.

At 404, shard mapping table 23(1) may be created and stored in spine node 20(1). Shard mapping table can be populated with information indicating which shard intervals are owned by which spine nodes in network fabric 15. In at least one embodiment, primary and backup shard intervals generated for spine node 20(1) can be mapped to spine node 20(1) (e.g., using a unique identifier of the spine node) in shard mapping table 23(1). Similarly, other primary and backup shard intervals generated for the other spine nodes can be mapped to those other spine nodes in shard mapping table 23(1).

At 406, shard mapping information can be advertised from spine node 20(1) to leaf nodes 30. In at least one embodiment, each spine node advertises its own shard mapping information to leaf nodes 30. In other embodiments, shard mapping information for multiple spine nodes 20 may be advertised by a single spine node. In yet other embodiments, at least two spines advertise the shard mapping information to different leaf nodes such that all leaf nodes receive the information from at least one spine.

When dynamic re-sharding is performed (e.g., at 402), endpoint repositories 25 of spine nodes 20 may not be correctly and/or fully populated. This can occur when shard intervals are dynamically recalculated based on some trigger such as, for example, a spine node crashing or otherwise ceasing to operate, a new spine node being added to network fabric 15, a spine node being removed from network fabric 15, a spine node being replaced in network fabric 15, excessive load detected on a spine node, etc. In these scenarios, the ranges of the shard intervals may change for some or all of the spines. Such a change could cause a spine node's endpoint repository (and hardware routing table) to contain routing information for endpoints that no longer correspond to the spine node's shard interval. Furthermore, the change could potentially cause a spine node's endpoint repository to no longer be fully populated with all of the endpoint routes owned by the spine node, according to its updated shard interval.

At 408, a determination can be made as to whether endpoint repository 25(1) of spine node 20(1) contains routing information that should be excluded based on the shard interval generated for spine node 20(1). If endpoint repository 25(1) is determined to contain routing information that should be excluded, then at 410, spine node 20(1) determines which spine nodes own the endpoint routing information that should be excluded. Spine node 20(1) may calculate a key for the endpoint associated with the endpoint routing information to be excluded. The key may be generated by hashing the BD and MAC address or the VRF and IP address of the endpoint, which may be stored in endpoint repository 25(1) with the routing information. Spine node 20(1) may then query shard mapping table 23(1) to identify the shard interval that includes the key, and to identify the spine node mapped to the shard interval. At 412, spine node 20(1) can forward the endpoint routing information to the identified spine node. At 414, the endpoint routing information can be deleted from endpoint repository 25(1). In at least one embodiment, operations of 408-414 (or some variation thereof) may be performed by endpoint synchronization protocol 22(1), which can sync the endpoint information from an old master spine (e.g., spine node 20(1)) to a new master spine. If no master spine for the particular shard range is alive, the new master spine may request the leaf nodes to republish their endpoint information.

At 416, if endpoint repository 25(1) is not fully populated with all of the endpoint routing information for endpoints associated with its new (or updated) shard intervals, then spine node 20(1) can learn the routing information from either another spine node in network fabric 15 or a leaf node or nodes to which the relevant endpoints are attached. Endpoint repository 25(1) may be populated with the learned endpoint routing information received from leaf nodes and/or spine nodes.

Figure 5:
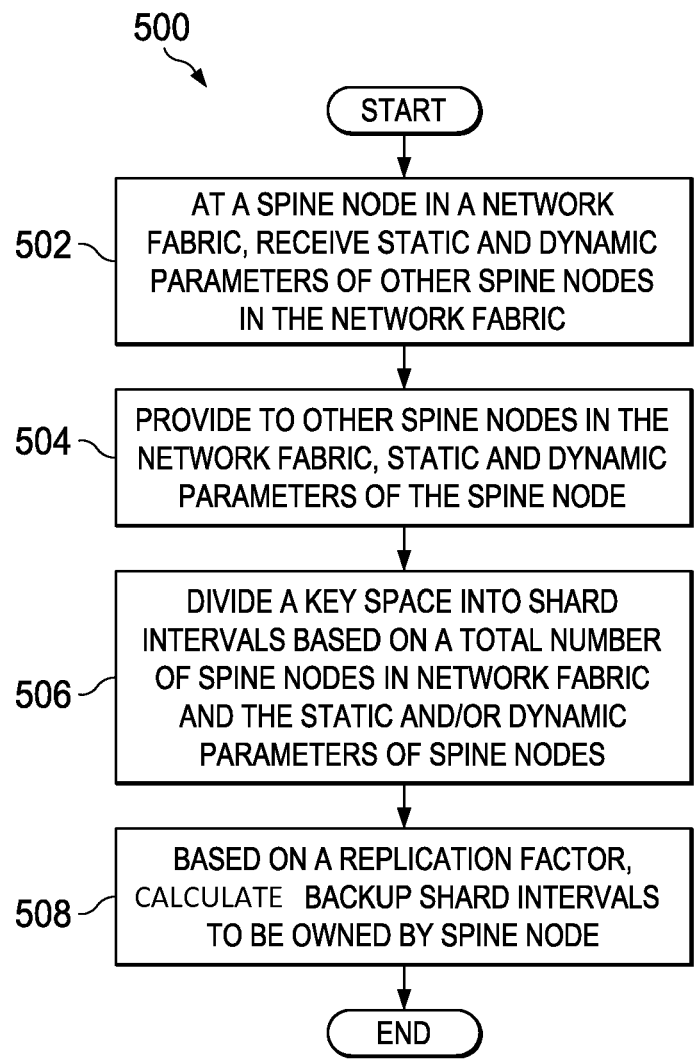
FIG. 5 is a simplified flowchart illustrating further possible operations associated with the partial replication system according to at least one embodiment.

FIG. 5 illustrates a flow 500 of one or more possible operations that may be performed by spine nodes 20 of FIGS. 1 and 2, in which spines nodes 20 negotiate with each other and apply a sharding algorithm to calculate shard intervals from a key space. Spine nodes 20 may comprise means, including for example, processors 29, for performing such operations. In at least one embodiment, negotiation modules 24 of spine nodes 20 can be used to perform, when executed by a processor, one or more of the operations.

At 502, spine node 20(1) receives static and dynamic parameters of other spine nodes in network fabric 15 via, for example, ping/pong beacon messages being exchanged among the spines. In some embodiments, spine node 20(1) may only receive static parameters, or may only receive dynamic parameters. Static parameters can include, for example, capacities of the other spines. For example, spine node 20(1) may receive a static parameter from spine node 20(3) indicating its capacity allows 0.6M endpoint routes. Dynamic parameters can include, for example, a current load and a fault state of a device. The current load of a spine node can indicate the amount of traffic being processed by the spine node. A fault state can indicate whether the spine node has an error, has crashed, or is operational.

At 504, spine node 20(1) may communicate its own static and dynamic parameters to the other spine nodes in network fabric 15. In addition, the tunnel endpoint IP (TEP IP) addresses of spine nodes 20 may be communicated to each other in at least some embodiments. This information exchange may occur to enable each spine node to know the parameters of all other spines in the fabric. Based on this knowledge, each spine can use the same sharding algorithm to independently divide a key space into shard intervals based on the same parameters. This ensures the resulting shard mapping to be in sync across the entire fabric.

At 506, spine node 20(1) applies a sharding algorithm to a key space (e.g., 32-bit) to divide the key space into shard intervals based on static and/or dynamic parameters of the spines and on the total number of spines in the network fabric. The number of resulting primary shard intervals can equal the total number of spine nodes in network fabric 15. Thus, one primary shard interval can be generated for each spine node. In at least one embodiment, the total number of spine nodes is intended to include operational spine nodes. Therefore, if a spine node has a fault state parameter indicating the spine node is no longer operational, then a shard interval may not be generated for that spine node.

Each primary shard interval can be generated based, at least in part, on static parameters (e.g., capacity) and possibly dynamic parameters (e.g., load). For example, the capacities of spine nodes 20 are static parameters that can be used to determine the proportion of the key space to be allocated for and assigned to each spine node as previously described herein. Dynamic parameters, such as a current load of a spine, may also be considered in some scenarios. For example, if spine node 20(1) has a load that is above a certain threshold load, then the maximum number of endpoints allowed by the spine node's capacity may be adjusted downwardly so that a smaller proportion of key space is allocated for and assigned to spine node 20(1). This may be done to enable spine node 20(1) to operate more efficiently.

In one example, particular ranges for the shard intervals in the key space can be determined by assigning the shard intervals to spine nodes 20 in numerical sort order of their tunnel endpoint IP (TEP IP) addresses. Spine node 20(1) can determine the particular range of the key space for its own primary and backup shard intervals. Spine node 20(1) may also determine the particular range of the key space for the other shard intervals assigned to the other spines.

At 508, the sharding algorithm of spine node 20(1) calculates one or more backup shard intervals for each of the spines based on a replication factor, #R. The replication factor #R could be configured for network fabric 15 by a user or determined automatically (e.g., default replication factor, network policies, tenant policies). In at least one embodiment, each spine can be the backup owner of #R shards. Also, the size of each backup shard for a particular spine can be the same size as the primary shard of that spine.

In at least one embodiment, flow 500 (or portions thereof) may be performed by each spine in a network fabric to independently divide a key space and determine primary and backup shard intervals for all of the spines in the fabric, including the particular ranges within the key space associated with the intervals. Each spine can store the resulting information in its own shard mapping table. It will be apparent, however, that numerous other implementations may be possible. For example, only a selected one or more spines may perform the sharding algorithm and then communicate the results to the other spines. In another example, one or more separate computing devices that are not configured as spines in the network fabric may perform the sharding algorithm and then communicate the results to the spines. If yet another example, each spine may calculate its own shard intervals (e.g., primary and backup) and then each spine may communicate this information to the other spines in the network fabric. These alternative possible implementations are offered merely for illustrative purposes and are not intended to limit the broad teachings of this disclosure. Furthermore, it should be appreciated that any number of other configurations and permutations may be implemented using the concepts of partial replication disclosed herein.

Figure 6:
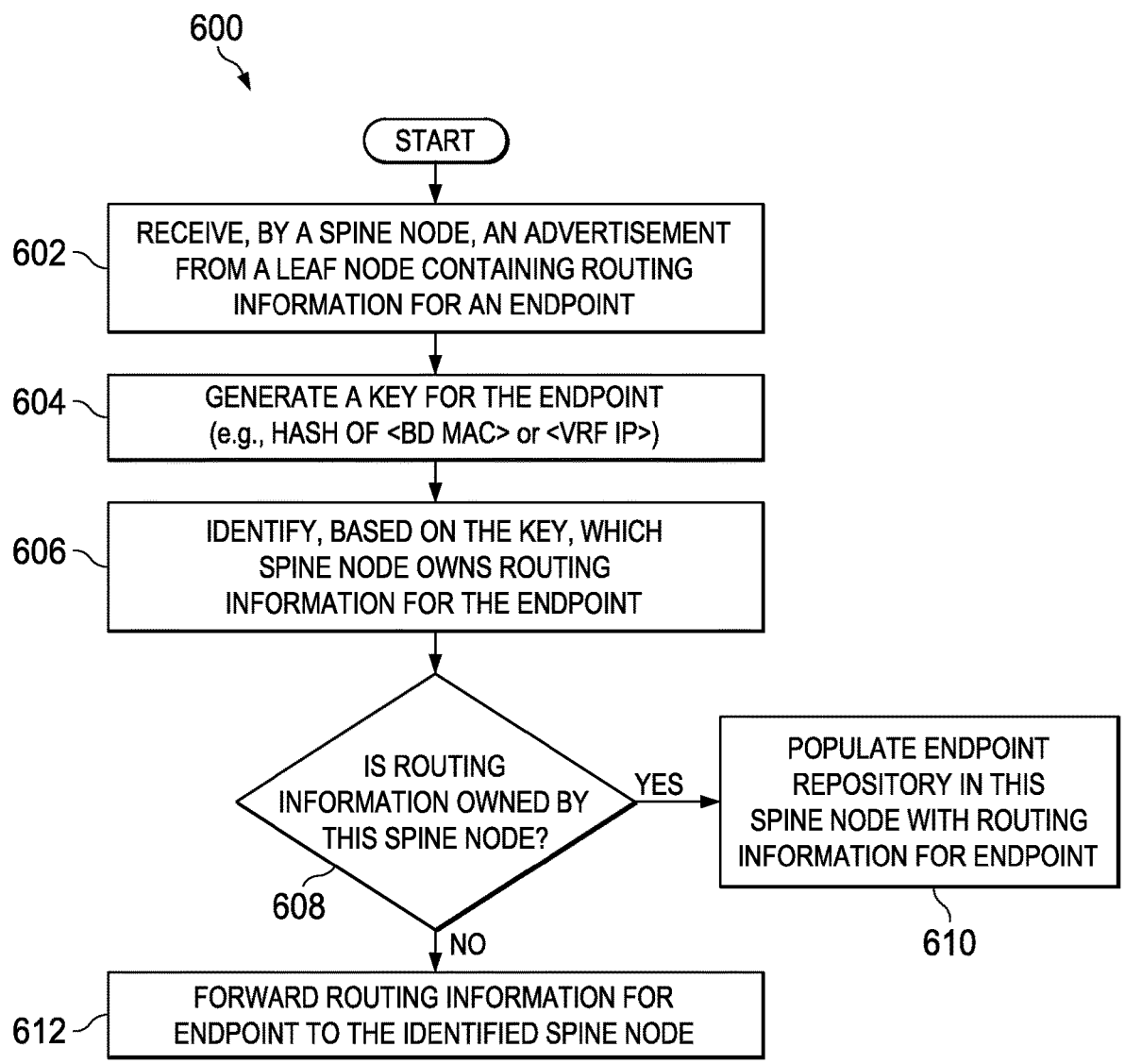
FIG. 6 is simplified flowchart illustrating further possible operations associated with the partial replication system according to at least one embodiment.

Turning to FIG. 6, a flow 600 illustrates one or more possible operations that may be performed by spine nodes 20 of FIGS. 1 and 2, in which spine nodes 20 learn routing information of endpoints attached to network fabric 15. Spine nodes 20 may comprise means, including for example, processors 29, for performing such operations. In at least one embodiment, endpoint synchronization protocol 22 of spine nodes 20 can be used to perform, when executed by a processor, one or more of the operations.

At 602, spine node 20(1) receives an advertisement from leaf node 30(1) containing routing information for endpoint 40(1). Spine node 20(1) may receive this advertisement from leaf node 30(1) when, for example, leaf node 30(1) learns of endpoint 40(1). In another possible scenario, spine node 20(1) may receive this advertisement from another spine node if, for example, the other spine node is forwarding the advertisement it received from leaf node 30(1). At 604, spine node 20(1) generates a key for endpoint 40(1). In one example, the key can be generated by applying a hashing algorithm to a BD and MAC address associated with the endpoint, or to a VRF and IP address associated with the endpoint. The hashing algorithm can hash the BD and MAC address or VRF and IP address into a 32-bit key space in at least one embodiment.

At 606, spine node 20(1) can determine, based on the key, which spine node in network fabric 15 owns routing information for endpoint 40(1). This may be determined by querying shard mapping table 23(1) of spine node 20(1) to identify a shard interval that includes the key, and to identify a spine node mapped to the identified shard interval. If the routing information is owned by spine node 20(1), as determined at 608, then at 610, endpoint repository 25(1) can be populated with the routing information for endpoint 40(1). However, if spine node 20(1) does not own the routing information as determined at 608, then at 612, spine node 20(1) can forward the endpoint routing information of endpoint 40(1) to the spine node identified from querying the shard mapping table. The endpoint routing information should be forwarded to the spines owning the primary and backup shards.

Figure 7:
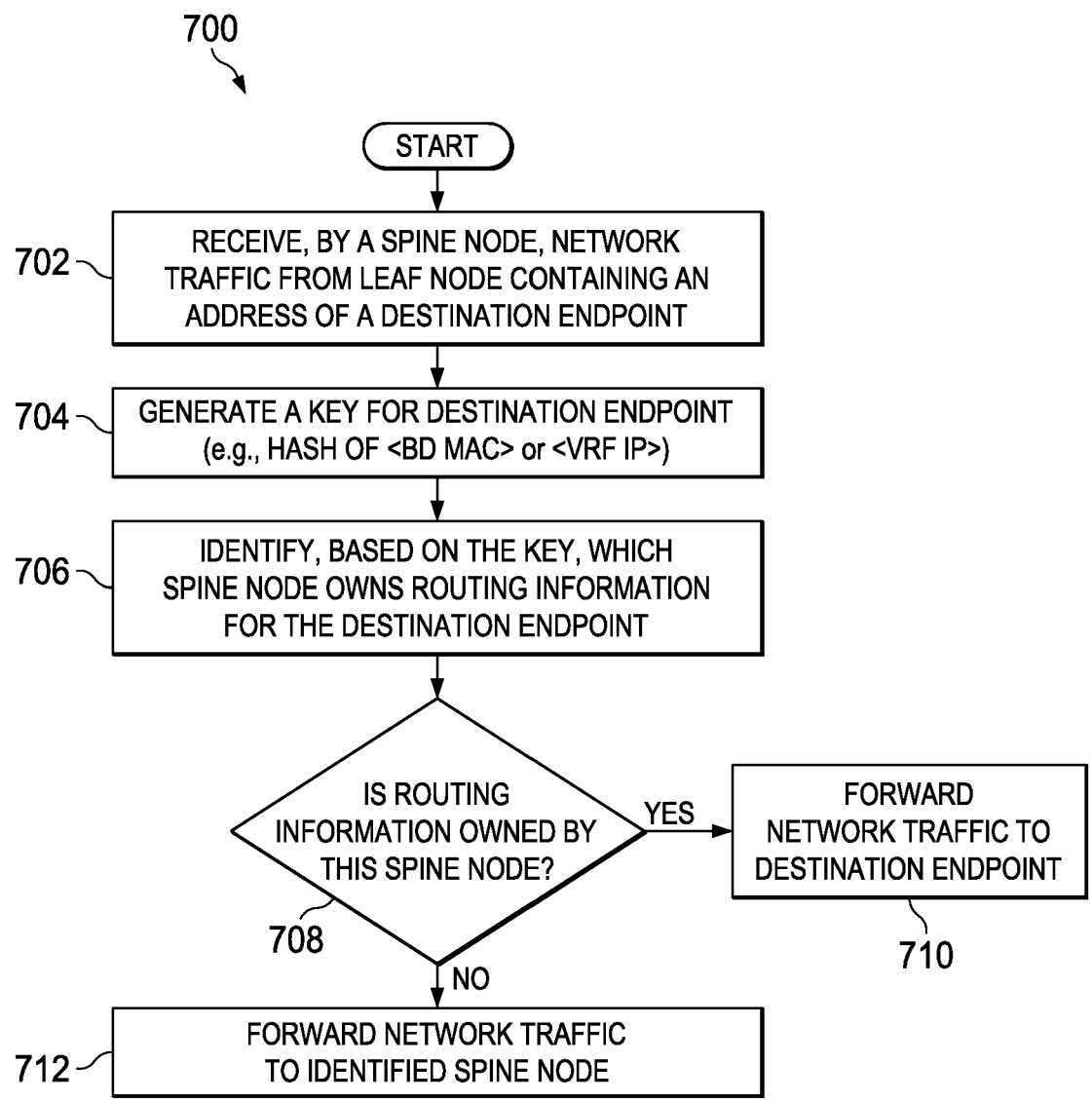
FIG. 7 is simplified flowchart illustrating further possible operations associated with the partial replication system according to at least one embodiment.

Turning to FIG. 7, a flow 700 illustrates one or more possible operations that may be performed by spine nodes 20 of FIGS. 1 and 2, when spine nodes 20 receive network traffic from a leaf node in network fabric 15. Spine nodes 20 may comprise means, including for example, processors 29, for performing such operations. In at least one embodiment, endpoint proxy modules 26 of spine nodes 20 can be used to perform, when executed by a processor, one or more of the operations.

At 702, spine node 20(1) receives network traffic from leaf node 30(1) in network fabric 15. This traffic can be unknown unicast traffic being sent from endpoint 40(1), which is connected behind leaf node 20(1), to a destination endpoint connected behind a different leaf node in network 10. At 704, spine node 20(1) generates a key for the destination endpoint. In one example, the key can be generated by applying a hashing algorithm to a BD and MAC address associated with the destination endpoint, or to a VRF and IP address associated with the destination endpoint. The hashing algorithm can hash the BD and MAC address or VRF and IP address into a 32-bit key space in at least one embodiment.

At 706, spine node 20(1) can determine, based on the key, which spine node in network fabric 15 owns routing information for the destination endpoint. This may be determined by querying shard mapping table 23(1) of spine node 20(1) to identify a shard interval that includes the key, and to identify a spine node mapped to the identified shard interval. If the routing information is owned by spine node 20(1), as determined at 708, then spine node 20(1) can look up routing information for the destination endpoint (e.g., in endpoint repository 25(1), in hardware routing table in TCAM). At 710, spine node 20(1) can forward the unknown unicast traffic according to the routing information. However, if spine node 20(1) does not own the routing information as determined at 708, then at 712, spine node 20(1) can forward the unknown unicast traffic to the spine node identified from querying the shard mapping table.

Figure 8:
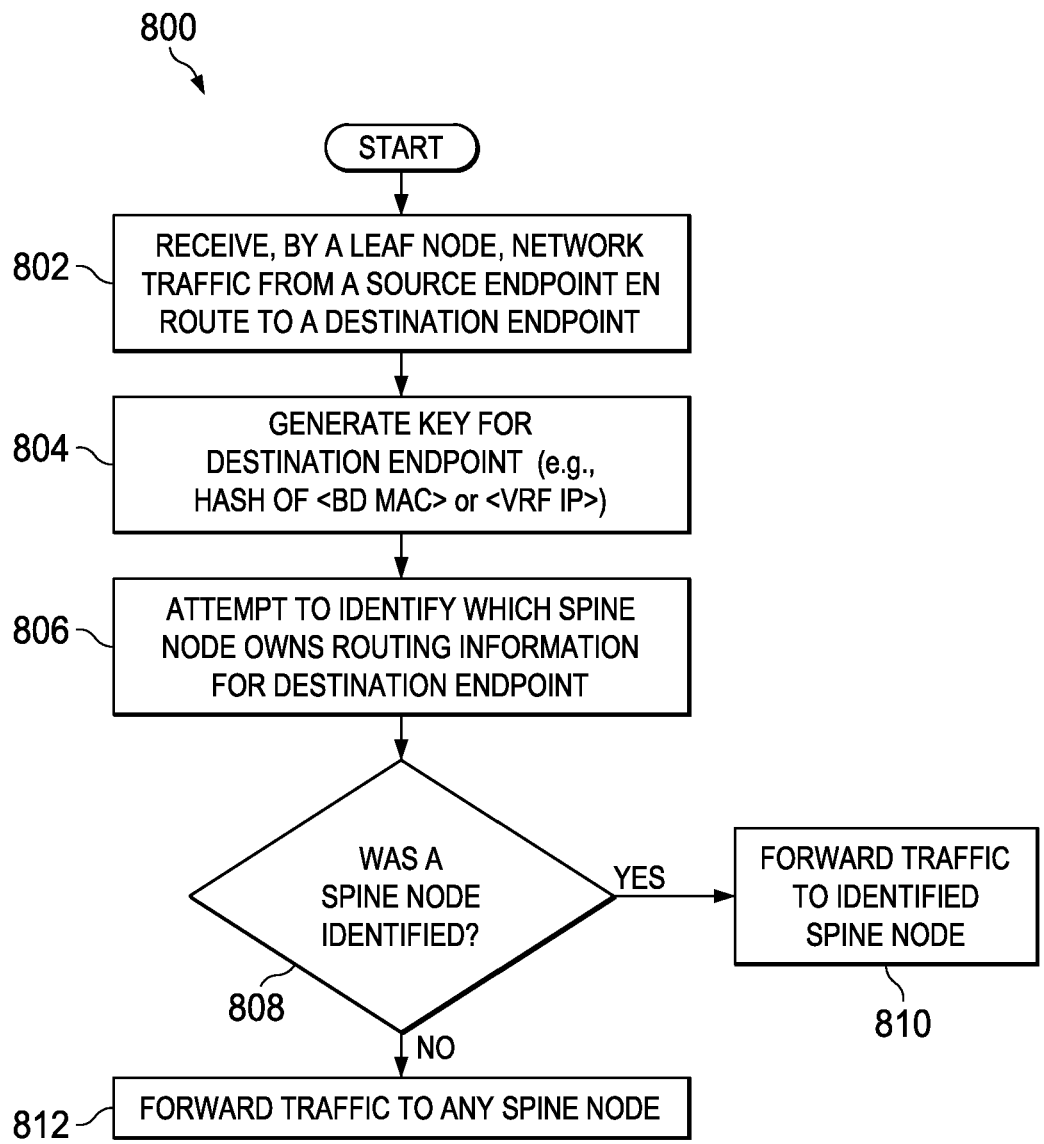
FIG. 8 is simplified flowchart illustrating yet further possible operations associated with the partial replication system according to at least one embodiment.

In FIG. 8, a flow 800 illustrates one or more possible operations that may be performed by leaf nodes 30 of FIGS. 1 and 2, when leaf nodes 30 receive unknown unicast network traffic from an attached endpoint. Leaf nodes 30 may comprise means, including for example, processors 39, for performing such operations. In at least one embodiment, forwarding modules 34 of leaf nodes 20 can be used to perform, when executed by a processor, one or more of the operations.

At 802, leaf node 30(1) receives unknown unicast traffic from an attached endpoint, such as endpoint 40(1), where the traffic is en route to a destination endpoint attached to another leaf node in network fabric 15. At 804, leaf node 30(1) generates a key for the destination endpoint. In one example, the key is can be generated by applying a hashing algorithm to a BD and MAC address associated with the destination endpoint, or to a VRF and IP address associated with the destination endpoint. The hashing algorithm can hash the BD and MAC address or VRF and IP address into a 32-bit key space in at least one embodiment.

At 806, leaf node 30(1) attempts to determine, based on the key, which spine node in network fabric 15 owns routing information for the destination endpoint. This may be determined by querying shard mapping table 33(1) of leaf node 30(1) to identify a shard interval that includes the key, and to identify a spine node mapped to the identified shard interval. If shard mapping information was previously propagated to leaf node 30(1) from spine nodes 20, then shard mapping table 33(1) can enable identification of the appropriate spine node. If a spine node is identified in the query as determined at 808, then at 810, leaf node 30(1) can forward the unknown unicast traffic to the identified spine node. If however, a spine node was not identified in the query, then at 812, the unknown unicast traffic may be forwarded to any one of the spine nodes.

Variations and Implementations

Note that in certain example implementations, the partial replication functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor or other similar machine, instructions in software, hardware, firmware, or any combination thereof, etc.). This tangible media may be non-transitory in at least one embodiment. In some of these instances, one or more memory elements (as shown in FIGS. 1-2) can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor (as shown in FIGS. 1 and 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In at least one example implementation, embodiments of spine and leaf nodes of a network fabric may include logic in order to achieve the partial replication functions outlined herein. These activities can be facilitated by various modules and protocols (e.g., endpoint synchronization modules 22, 32, negotiation modules 24, endpoint proxy modules 26, forwarding modules 34), which can be suitably combined in any appropriate manner, or partitioned in any appropriate manner, and which may be based on particular configuration and/or provisioning needs. Additionally, these network elements may include one or more processors (e.g., processors 29, 39) that can execute software, an algorithm, or other instructions to perform the partial replication functions, as disclosed herein. These network elements may further keep information, to be used in achieving the partial replication activities as discussed herein, in any suitable memory element (random access memory (RAM), read only memory (ROM), EPROM, EEPROM, ASIC, Ternary Content-Addressable Memory (TCAM), etc.), software, hardware, or in any other suitable component, device, element, or object where appropriate and based on particular needs. Any of the memory items discussed herein (e.g., repositories, caches, stores, databases, tables, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that network fabric 15 and its teachings are readily scalable and can accommodate a large number of components, as well as more complicated/sophisticated arrangements and configurations. For example, a system for providing partial replication of endpoint routing information can be implemented in multiple fabric pods connected to each other. Accordingly, the examples provided should not limit the scope or inhibit the broad teachings of the partial replication system as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. The use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

It is also important to note that the activities, interactions, and operations in the preceding flow diagrams illustrate only some of the possible partial replication scenarios and patterns that may be executed by, or within, embodiments of a system for partially replication endpoint routing information. Some of these activities, interactions, and/or operations may be deleted or removed where appropriate, or may be modified, divided, or changed considerably without departing from the scope of the present disclosure. In addition, a number of these activities, interactions, and/or operations have been described as being executed before, after, concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by the partial replication system in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although network fabric 15 has been illustrated with reference to particular elements and operations that facilitate the communication process, these elements and operations may be replaced by any suitable architecture, protocols, and/or processes that achieve the intended functionality of network fabric 15.

What is claimed is:

1. A method, comprising:
generating a first shard interval based, at least in part, on capacities of a plurality of spine nodes in a leaf-spine network fabric, wherein the first shard interval includes a portion of a plurality of keys corresponding to a plurality of endpoints;
creating a shard mapping table with the first shard interval mapped to a first spine node of the plurality of spine nodes, wherein the shard mapping table is replicated in each of the plurality of spine nodes;
advertising the shard mapping table to a set of leaf nodes in the leaf-spine network fabric; and
determining, based on the shard mapping table and a key corresponding to a first endpoint from the plurality of endpoints, whether to include routing information corresponding to the first endpoint in an endpoint repository associated with the first spine node, the endpoint repository comprising a routing information base (RIB).

2. The method of claim 1, further comprising:
determining a capacity of the first spine node of the plurality of spine nodes; and
receiving capacity information indicating one or more other capacities for one or more other ones of the plurality of spine nodes.

3. The method of claim 1, further comprising:
calculating one or more backup shard intervals based on a configurable replication factor based, in part, on one or more dynamic parameters of the first spine node, the one or more backup shard intervals including each key of the first shard interval, the configurable replication factor indicating a number of backup shards that each of the plurality of spine nodes owns.

4. The method of claim 1, further comprising:
receiving, at the first spine node, a packet en route to a destination endpoint;
identifying, if the destination endpoint does not correspond to the first shard interval, a second spine node mapped to a second shard interval, the destination endpoint corresponding to the second shard interval; and
forwarding the packet to the second spine node.

5. The method of claim 1, wherein a hashing algorithm applied to a unique identifier of the plurality of endpoints generates the portion of the plurality of keys that are included in the first shard interval.

6. The method of claim 1, further comprising:
calculating one or more other shard intervals for each one or more other spine nodes of the plurality of spine nodes based, at least in part, on the capacities of the plurality of spine nodes.

7. The method of claim 6, wherein the first shard interval and the one or more other shard intervals are assigned to the plurality of spine nodes in numerical sort order of tunnel endpoint Internet Protocol (IP) addresses of the plurality of spine nodes.

8. The method of claim 1, further comprising:
mapping at least one backup shard interval to the first spine node, wherein the at least one backup shard interval includes at least a portion of another shard interval mapped to another spine node.

9. The method of claim 8, wherein each of the portion of the plurality of keys of the first shard interval is included in one or more backup shard intervals mapped to one or more other spine nodes based on a replication factor.

10. The method of claim 1, wherein the shard mapping table includes shard mapping information, and the shard mapping information is communicated out of band to the set of leaf nodes in the leaf-spine network fabric.

11. The method of claim 1, further comprising:
dynamically recalculating the first shard interval to determine an updated first shard interval based on the capacities of the plurality of spine nodes and one or more dynamic parameters of at least one spine node of the plurality of spine nodes.

12. The method of claim 11, wherein the one or more dynamic parameters include a load of one or more of the plurality of spine nodes.

13. At least one non-transitory, machine readable storage medium comprising instructions that, when executed by a processor, cause the processor to:
generate a first shard interval based, at least in part, on capacities of a plurality of spine nodes in a leaf-spine network fabric, wherein the first shard interval includes a portion of a plurality of keys corresponding to a plurality of endpoints;
create a shard mapping table with the first shard interval mapped to a first spine node of the plurality of spine nodes, wherein the shard mapping table is replicated in each of the plurality of spine nodes;
advertise the shard mapping table to a set of leaf nodes in the leaf-spine network fabric; and
determine, based on the shard mapping table and a key corresponding to a first endpoint from the plurality of endpoints, whether to include routing information corresponding to the first endpoint in an endpoint repository associated with the first spine node, the endpoint repository comprising a routing information base (RIB).

14. The medium of claim 13, wherein the shard mapping table includes shard mapping information for a plurality of shard intervals mapped to at least one spine node from the plurality of spine nodes.

15. The medium of claim 13, wherein the instructions further cause the processor to dynamically recalculate the first shard interval to determine an updated first shard interval based on the capacities of the plurality of spine nodes and one or more dynamic parameters of at least one spine node of the plurality of spine nodes.

16. The medium of claim 15, wherein the one or more dynamic parameters include at least one of a load of the first spine node and a fault state of one or more of the plurality of spine nodes.

17. An apparatus comprising:
at least one memory element having instructions stored therein; and
at least one processor, wherein the instructions when executed by the at least one processor, cause the processor to:
generate a first shard interval based, at least in part, on capacities of a plurality of spine nodes in a leaf-spine network fabric, wherein the first shard interval includes a portion of a plurality of keys corresponding to a plurality of endpoints;
create a shard mapping table with the first shard interval mapped to a first spine node of the plurality of spine nodes, wherein the shard mapping table is replicated in each of the plurality of spine nodes;
advertise the shard mapping table to a set of leaf nodes in the leaf-spine network fabric;
determine, based on the shard mapping table and a key corresponding to a first endpoint from the plurality of endpoints, whether to include routing information corresponding to the first endpoint in an endpoint repository associated with the first spine node, the endpoint repository comprising a routing information base (RIB).

18. The apparatus of claim 17, wherein the first shard interval is calculated based, in part, on one or more dynamic parameters of at least one spine node of the plurality of spine nodes.

19. The apparatus of claim 17, wherein a hashing algorithm applied to a unique identifier of the plurality of endpoints is used to generate the portion of the plurality of keys that are included in the first shard interval.

20. The apparatus of claim 17, wherein, the instructions further cause the processor to map one or more backup shard intervals to the first spine node, and the one or more backup shard intervals include at least a portion of another shard interval mapped to another spine node.

* * * * *